United States Patent

Kabasawa

[11] Patent Number: 5,987,013
[45] Date of Patent: Nov. 16, 1999

[54] HANDOFF CONTROL WITH A PILOT USED IN A CELL OF A NEIGHBORING CELL IN A CDMA MOBILE COMMUNICATION NETWORK ON A SERVICE FREQUENCY OF THE NEIGHBORING CELL

[75] Inventor: Shizuko Kabasawa, Tokyo, Japan

[73] Assignee: NEC Corporation, Tokyo, Japan

[21] Appl. No.: 08/831,698

[22] Filed: Apr. 10, 1997

[30] Foreign Application Priority Data

Apr. 10, 1996 [JP] Japan .................................. 8-087886

[51] Int. Cl.⁶ .......................... H04Q 7/212; C12N 5/06; H04B 15/00; A63H 17/00
[52] U.S. Cl. .......................... 370/331; 370/335; 375/205; 445/437; 445/442
[58] Field of Search ..................................... 370/331, 332, 370/335, 342, 343, 333, 320; 375/200, 205; 455/436, 443, 437, 433

[56] References Cited

U.S. PATENT DOCUMENTS

| | | | |
|---|---|---|---|
| 5,101,501 | 3/1992 | Gilhousen et al. | 445/437 |
| 5,267,261 | 11/1993 | Blakeney, II et al. | 370/335 |
| 5,295,153 | 3/1994 | Gudmundson | 375/1 |
| 5,303,286 | 4/1994 | Wiedeman | 375/205 |
| 5,434,853 | 7/1995 | Hemmady et al. | 370/331 |
| 5,548,808 | 8/1996 | Bruckert et al. | 455/442 |
| 5,574,983 | 11/1996 | Douzono et al. | 455/442 |

*Primary Examiner*—Hassan Kizou
*Assistant Examiner*—Duc Ho
*Attorney, Agent, or Firm*—Foley & Lardner

[57] ABSTRACT

To expedite handoff control while a mobile unit moves between first and neighboring second cells, A and B frequencies are assigned for traffic communication to a first base station and only B frequency is assigned for traffic communication to a second base station, and both of the base stations are connected to a control station, where the first base station is assigned to the first cell and the second base station is assigned to the second cell. The mobile unit has been assigned A frequency in the first base station, and the second base station is accompanied by a pilot transmitting device for transmitting only a pilot signal on the A frequency. As soon as it is informed of deterioration in a field intensity of the frequency at the mobile unit together with pilot information specific to the pilot signal from the first base station, the control station makes a determination that the mobile unit is approaching the second base station, and deals with a handoff from the A frequency to the B frequency.

20 Claims, 3 Drawing Sheets

HANDOFF CONTROL WITH A PILOT USED IN A CELL OF A NEIGHBORING CELL IN A CDMA MOBILE COMMUNICATION NETWORK ON A SERVICE FREQUENCY OF THE NEIGHBORING CELL

BACKGROUND OF THE INVENTION

This invention relates to handoff control used for a mobile unit either in a CDMA (code division multiple access) mobile communication network or in a combination of the CDMA mobile communication network and a neighboring or contiguous mobile communication network, such as an analog cellular network, which is operable in accordance with other than a CDMA technique.

In the manner described in U.S. Pat. No. 5,295,153 and as will later be described in greater detail, a CDMA mobile communication network has a service area in which a mobile unit is movable and which is divided into a plurality of cells including first and second cells neighboring each other. The CDMA mobile communication network comprises a control station and first and second base stations connected in the first and the second cells to the control station. First and second service frequencies are assigned to the first and the second base stations for traffic communication with the mobile unit while the mobile unit is in the first and the second cells, respectively.

The control station may or may not be situated in the service area. In any event, the control station comprises a control device for detecting necessity of handoff between the first and the second service frequencies and for dealing with the handoff when the necessity is detected.

Like the CDMA mobile communication network, the above-described combination has a common service area in which a mobile unit is movable and which is divided into a plurality of cells including first and second cells neighboring each other. The combination comprises a control station and first and second base stations connected in the first and the second cells to the control station. First and second service frequencies are assigned to the first and the second base stations for traffic communication with the mobile unit while the mobile unit is in the first and the second cells.

The control station may or may not be in the common area. When situated in the common area, the control station may be in a component service area of whichever of the CDMA mobile communication network and the neighboring mobile communication network. In any event, the control station comprises a control device operable in the manner described in the foregoing.

When the combination is taken into consideration with attention directed to the United States patent referenced above, the first cell is in the neighboring mobile communication network and is an urban or umbrella cell. The second cell is in the CDMA mobile communication network and is a rural cell or a microcell. Attention is primarily directed to allocation of frequencies between such cells of different cell sizes. In this connection, the handoff is discussed as regards a cell border between the first and the second cells, namely, as regards a difference between uplink (from the mobile unit to a base station) and downlink (from the base station to the mobile unit) handoff points. In order to use Mobile Assisted Handoff (MAHO) in the CDMA mobile communication network, use is made of a pilot signal or sequence and of a subtraction demodulation process.

In such a conventional mobile communication network and particularly in an analog mobile communication network, it has been the practice to deal with the handoff control as follows. On describing the handoff control, it will be presumed that the mobile unit is currently present in the first cell in traffic communication with the first base station, namely, transmitting an uplink traffic signal to and/or receiving a downlink traffic signal from the first base station, on the first service frequency and is moving towards one of neighboring cells that may be called a destination cell. Furthermore, attention will be directed as a representative to only one of such mobile units which may be concurrently alive in the first cell. Although different frequencies may be assigned to a base station in transmitting the uplink and the downlink traffic signals, such different frequencies will collectively be called a service frequency.

When the mobile unit approaches the cell border between the first cell and the destination cell, an electromagnetic or radio wave of the first service frequency becomes very weak to be objectionable at the mobile unit. In this event, the first service frequency must be handed off or over to a service frequency which is assigned to the destination cell, namely, to the base station placed in the destination cell.

It takes a long time to find which of the neighboring cells is actually the destination cell. During this long time, the traffic signal is received at the mobile unit and the first base station with an objectionable signal quality. Moreover, each base station and consequently the mobile communication unit have a large scale. A great amount of information must be transmitted between the control station and the base stations situated in the neighboring cells.

SUMMARY OF THE INVENTION

It is therefore an object of the present invention to provide a handoff control method for use in a code division multiple access mobile communication network comprising a control station and a plurality of base stations connected to the control station and having a service area in which a mobile unit is movable and which is divided into cells for the respective base stations with different service frequencies assigned to the respective base stations, which method is for controlling handoff for the mobile unit between two of the different service frequencies in a short time interval and with a substantially no duration of a deteriorated signal quality.

It is another object of this invention to provide a handoff control method which is of the type described and in which each base station is on a small scale with only a small amount of information transmitted between the control station and each of two of the base stations that are related to movement of the mobile unit.

It is still another object of this invention to provide a handoff control method for use in a combination of a code division multiple access mobile communication network and a neighboring or contiguous mobile communication network, the combination comprising a control station and a plurality of base stations connected to the control station and having a common service area in which a mobile unit is movable and which is divided into cells for the respective base stations with different service frequencies assigned to the respective base stations, which method is for controlling handoff for the mobile station between two of the different service frequencies in a short time interval and with a substantially no duration of a deteriorated signal quality.

It is yet another object of this invention to provide a handoff control method which is of the type described and in which each base station is on a small scale with only a small amount of information transmitted between the control station and each of two of the base stations that are related to movement of the mobile unit.

It is a different object of this invention to provide a handoff control system for use in a code division multiple access mobile communication network comprising a control station and a plurality of base stations connected to the control station and having a service area in which a mobile unit is movable and which is divided into cells for the respective base stations with different service frequencies assigned to the respective base stations, which system is for controlling handoff for the mobile unit between two of the different frequencies in a short time interval and with a substantially no duration of a deteriorated signal quality.

It is another different object of this invention to provide a handoff control system which is of the type described and in which each base station is on a small scale with only a small amount of information transmitted between the control station and each of two of the base stations that are assigned with the above-mentioned two of the different service frequencies.

It is still another different object of this invention to provide a handoff control system for use in a combination of a code division multiple access mobile communication network and a neighboring or contiguous mobile communication network,-the combination comprising a control station and a plurality of base stations connected to the control station and having a common service area in which a mobile unit is movable and which is divided into cells for the respective base stations with different service frequencies assigned to the respective base stations, which system is for controlling handoff for the mobile unit between two of the different service frequencies in a short time interval and with a substantially no duration of a deteriorated signal quality.

It is yet another different object of this invention to provide a handoff control system which is of the type described and in which each base station is on a small scale with only a small amount of information transmitted between the control station and each of two of the base stations that are assigned with the above-mentioned two of the different service frequencies.

It is a further different object of this invention to provide a control station for use in a code division multiple access mobile communication network comprising a plurality of base stations connected to the control station and having a service area in which a mobile unit is movable and which is divided into cells for the respective base stations with different service frequencies assigned to the respective base stations, which control station is for controlling handoff for the mobile unit between two of the different service frequencies in a short time interval and with substantially no duration of a deteriorated signal quality.

It is another further different object of this invention to provide a control station which is of the type described and for which each base station is on a small scale with only a small amount of information transmitted between the control station and each of two of the base stations that are assigned with the above-mentioned two of the different service frequencies.

It is still another further different object of this invention to provide a control station for use in a combination of a code division multiple access mobile communication network and a neighboring or contiguous mobile communication network, the combination comprising a plurality of base stations connected to the control station and having a common service area in which a mobile unit is movable and which is divided into cells for the respective base stations with different service frequencies assigned to the respective base stations, which control station is for controlling handoff for the mobile unit between two of the different service frequencies with a short time interval and with a substantially no duration of a deteriorated signal quality.

It is yet another further different object of this invention to provide a control station which is of the type described and for which each base station is on a small scale with only a small amount of information transmitted between the control station and each of two of the base station that are assigned with the above-mentioned two of the different service frequencies.

Other objects of this invention will become clear as the description proceeds.

In accordance with an aspect of this invention, there is provided a handoff control method for use in a code division multiple access mobile communication network comprising a control station and first and second base stations connected to the base station and having a service area in which a mobile unit is movable and which is divided into a plurality of cells including first and second cells neighboring each other, the handoff control method comprising the steps of (a) assigning first and second service frequencies to the first and the second base stations for traffic communication with the mobile unit while the mobile unit is in the first and the second cells, (b) detecting necessity of handoff between the first and the second service frequencies, and (c) dealing with the handoff when the necessity is detected, wherein (A) the assigning step assigns the second service frequency additionally to the first base station for an alternative use in the traffic communication and the first service frequency to the second base station for transmitting only a pilot signal, (B) the dealing step dealing with, while the mobile unit moves from the first cell towards the second cell during the traffic communication with the first base station on the first service frequency, handoff from the first service frequency to the second service frequency when the necessity is detected.

In accordance with another aspect of this invention, there is provided a handoff control method for use in a combination of a code division multiple access communication network and a neighboring mobile communication network, the combination comprising a control station and first and second base stations connected to the control station and having a common service area in which a mobile unit is movable and which is divided into a plurality of cells including a first cell of the neighboring mobile communication network and a second cell neighboring the first cell in the code division multiple access mobile communication network, the handoff control method comprising the step of (a) assigning first and second service frequencies to the first and the second base stations for traffic communication with the mobile unit while the mobile unit is in the first and the second cells, (b) detecting necessity of handoff between the first and the second service frequencies, and (c) dealing with the handoff when the necessity is detected, wherein (A) the assigning step assigns the second service frequency additionally to the first base station for an alternative use in the traffic communication and the first service frequency to the second base station for transmitting only a pilot signal, (B) the dealing step dealing with, while the mobile unit moves from the first cell towards the second cell during the traffic communication with the first base station or the first service frequency, handoff from the first service frequency to the second service frequency when the necessity is deleted.

In accordance with a different aspect of this invention, there is provided a handoff control system for use in a code division multiple access mobile communication network comprising a control station and first and second base stations connected to the control station and having a service area in which a mobile unit is movable and which is divided into a plurality of cells including first and second cells neighboring each other with the first and the second base stations assigned with first and second service frequencies for traffic communication with the mobile unit while the mobile unit is in the first and the second cells, the control station comprising a control device for detecting necessity of handoff between the first and the second service frequencies and for dealing with the handoff when the necessity is detected, wherein (A) the first base station is additionally assigned with the second service frequency for an alternative use in the traffic communication, (B) the second base station comprising a pilot transmitting device for transmitting only a pilot signal on the first service frequency, (C) the control device dealing with, when the necessity is detected while the mobile unit moves from the first cell towards the second cell during the traffic communication with the first base station on the first service frequency, handoff from the first service frequency to the second service frequency.

In accordance with another different aspect of this invention, there is provided a handoff control system for use in a combination of a code division multiple access mobile communication network and a neighboring mobile communication network, the combination comprising a control station and first and second base stations connected to the control station and having a common service area in which a mobile unit is movable and which is divided into a plurality of cells including a first cell of the neighboring mobile communication network and a second cell neighboring the first cell in the code division multiple access mobile communication network with the first and the second base stations assigned with first and second service frequencies for traffic communication with the mobile unit while the mobile unit is in the first and the second cells, the control station comprising a control device for detecting necessity of handoff between the first and the second service frequencies and for dealing with the handoff when the necessity is detected, wherein (A) the first base station is additionally assigned with the second service frequency for an alternative use in the traffic communication, (B) the second base station comprising a pilot transmitting device for transmitting only a pilot signal on the first service frequency, (C) the control device dealing with, when the necessity is detected while the mobile unit moves from the first cell towards the second cell during the traffic communication with the first base station on the first service frequency, handoff from the first service frequency to the second service frequency.

In accordance with still another different aspect of this invention, there is provided a control station for use in a code division multiple access mobile communication network comprising first and second base stations connected to the control station and having a service area in which a mobile unit is movable and which is divided into a plurality of cells including first and second cells neighboring each other with the first and the second base stations assigned with first and second service frequencies for traffic communication with the mobile unit while the mobile unit is in the first and the second cells, the control station comprising a control device for detecting necessity of handoff between the first and the second service frequencies and for dealing with the handoff when the necessity is detected, wherein (A) the first base station is additionally assigned with the second service frequency for an alternative use in the traffic communication, (B) the second base station comprising a pilot transmitting device for transmitting only a pilot signal on the first service frequency, (C) the control device dealing with, when the necessity is detected while the mobile unit moves from the first cell towards the second cell during the traffic communication with the first base station on the first service frequency, handoff from the first service frequency to the second service frequency.

In accordance with yet another different aspect of this invention, there is provided a control station for use in a combination of a code division multiple access mobile communication network and a neighboring mobile communication network, the combination comprising first and second base stations connected to the control station and having a common service area in which a mobile unit is movable and which is divided into a plurality of cells including a first cell of the neighboring mobile communication network and a second cell neighboring the first cell in the code division multiple access mobile communication network with the first and the second base stations assigned with first and second service frequencies for traffic communication with the mobile unit while the mobile unit is in the first and the second cells, the control station comprising a control device for detecting necessity of handoff between the first and the second service frequencies and for dealing with the handoff when the necessity is detected, wherein (A) the first base station is additionally assigned with the second service frequency for an alternative use in the traffic communication, (B) the second base station comprising a pilot transmitting device for transmitting only a pilot signal on the first service frequency, (C) the control device dealing with, when the necessity is detected while the mobile unit moves in the first cell towards the second cell during the traffic communication with the first base station on the first service frequency, handoff from the first service frequency to the second service frequency.

DESCRIPTION OF THE PREFERRED EMBODIMENTS

Figure 1:
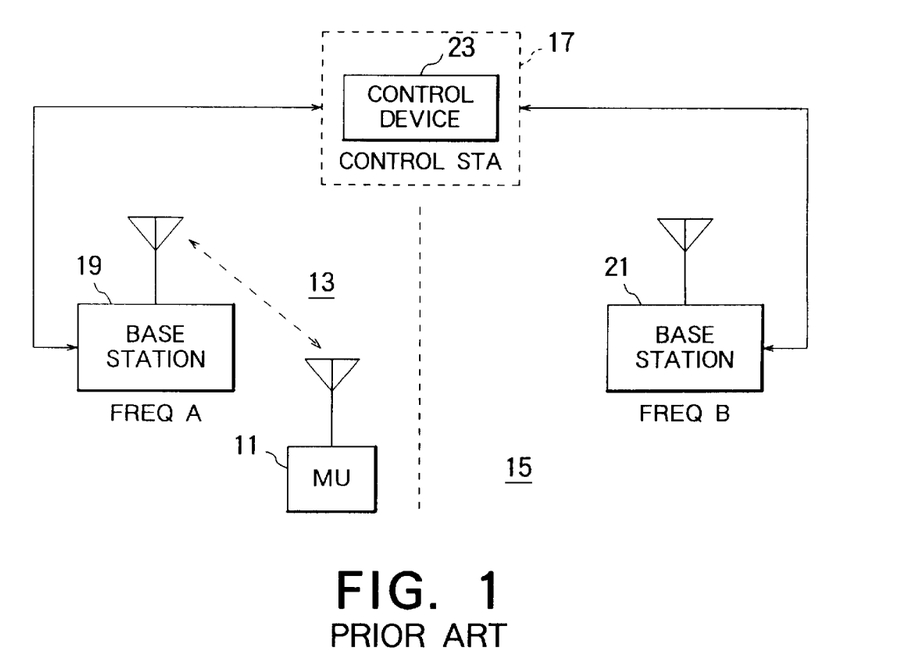
FIG. 1 is a schematic top view of a CDMA (code division multiple access) mobile communication network comprising a conventional handoff control system.

Referring to FIG. 1, a conventional handoff control system will first be described in order to facilitate an understanding of the present invention. In FIG. 1, the handoff control system is used in a CDMA (code division multiple access) mobile communication network, which is a digital cellular communication network according to IS-95 specified by the TIA (Telecommunications Industry Association) of the United States of America.

In the manner known in the art, the CDMA mobile communication network has a service area represented by a sheet surface of FIG. 1. In the service area, a plurality of mobile units are movable. By way of example, only one mobile unit (MU) 11 is depicted. The mobile unit 11 may be a portable telephone handset, a mobile terminal device carried on a vehicle, or a like device.

The service area is divided into a plurality of cells which include first and second cells 13 and 15 neighboring each other. The first and the second cells 13 and 15 are contiguous to each other at a cell border which is depicted by a vertical dashed line.

The CDMA mobile communication network comprises a control station 17, which may not necessarily be situated in the service area and may be an exchange office connected to a public wired communication network (not shown). In the first and the second cells, first and second base stations 19 and 21 are situated and are connected to the control station 17. Each of the first and the second stations 19 and 21 is a radio station, and is connected to the control station 17 by a radio or a wired link depicted by a solid line.

In the manner described heretobefore, first and second service frequencies A and B are assigned to the first and the second base stations 19 and 21. Assignment of the first and the second service frequencies is indicated by legends FREQ A and FREQ B near the rectangles or blocks indicative of the first and the second base stations 19 and 21. The first and the second service frequencies A and B are used by the first and the second base stations 19 and 21 and by the mobile unit 11 in traffic communication while the mobile unit 11 is in the first and the second cells 13 and 15, respectively. The traffic communication is transmitting a traffic signal either from one of the first and the second base stations 19 and 21 downwards to the mobile unit 11 or from the mobile unit 11 upwards to one of the first and the second base stations 19 and 21. In the example being illustrated, the mobile unit 11 is in the first cell 13 and is in traffic communication with the first base station 19 as shown by a dashed line with arrowheads on both ends.

The control station 17 comprises a control device 23. Serving as an element of the handoff control system, the control device 23 detects necessity of handoff for the mobile unit 11 between the first and the second service frequencies A and B and deals with the handoff when the necessity is detected.

Figure 2:
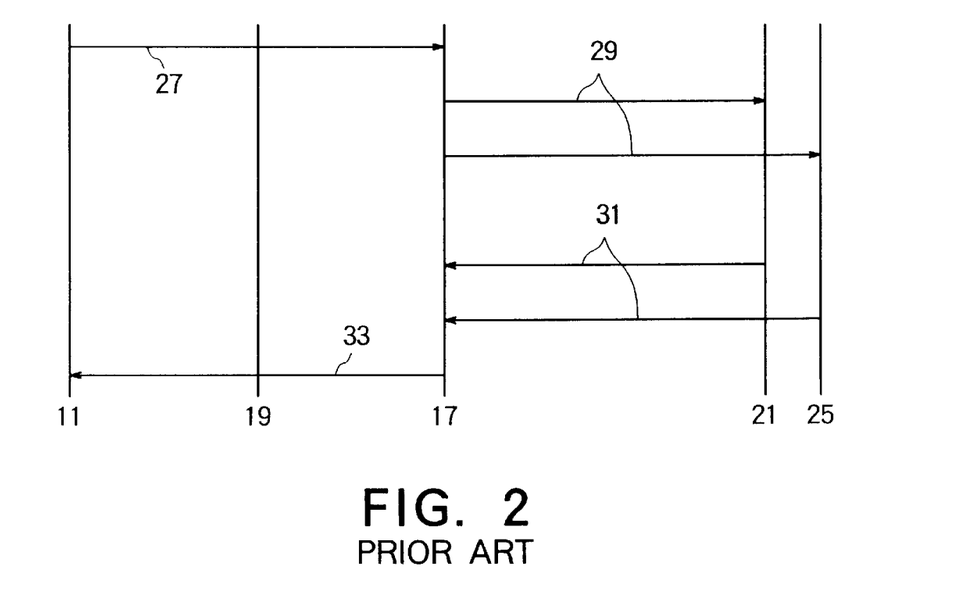
FIG. 2 is a sequence diagram for use in describing conventional handoff control carried out by the handoff control system depicted in FIG. 1.

Referring to FIG. 2 in addition to FIG. 1, conventional handoff control will be described more in detail. For this purpose, it will be assumed that the mobile unit 11 is currently moving in the first cell 13 towards the second cell 15. Usually, the first cell 13 is neighbored besides the second cell 15 by several other neighboring cells in which situated are neighboring base stations collectively indicated in FIG. 2 by a reference numeral 25. While present in the first cell 13, the mobile unit 11 receives from the first base station 19 an electromagnetic or radio wave of the first service frequency A. When the mobile unit 11 approaches the cell border, this electromagnetic wave is received with a weak field intensity to become eventually objectionably weak to result in a deteriorated traffic signal quality.

In the meanwhile, the mobile unit 11 transmits a result of a field intensity measurement to the first base station 19 and thence to the control station 17 in the manner depicted by a lefthand upper horizontal line 27. Receiving a report of the field intensity measurement in the control station 17, the control device 23 makes the control station 17 send a field intensity measure request signal to the second base station 21 and to all other neighboring base stations 25 as indicated by righthand upper horizontal lines 29.

Conveying to the mobile unit 11 the field intensity measure request, the second base station 21 and the neighboring base stations 25 receive and send back to the control station 17 results of field intensity measurement of electromagnetic waves of the second service frequency B and other different service frequencies assigned to the neighboring base stations 25. Such reports are indicated by righthand lower horizontal lines 31.

Responsive to the reports 31 received at the control station 17, the control device 23 judges that the second cell 15 is a destination cell of the mobile unit 11. Through the first base station 19, the control device 23 indicates to the mobile unit 11 as depicted by a lefthand lower horizontal line 33 that handoff should be carried out from the first service frequency A to the second service frequency B.

In this manner, it takes in the conventional handoff control a long time interval to identify which of the second cell 15 and the other neighboring cells is the destination cell. After the destination cell is identified, the handoff control is actually carried out. Consequently, the traffic signal is received with the deteriorated signal quality at the mobile unit 11 and at the first base station 19. Inasmuch as the mobile unit 11 continuously uses the first service frequency A, the second base station 21 and the other neighboring base stations 25 are hardly possible to receive the traffic communication from the mobile unit 11. In a worst case, the mobile unit 11 moves beyond the cell border of the first cell 13 and may go astray.

Moreover, the mobile unit 11 must measure the field intensities of the electromagnetic waves received from the second base station 21 and the other neighboring base stations 25. Alternatively, each of the second base station 21 and the neighboring base stations 25 must measure the field intensities of the electromagnetic waves sent back from the mobile unit 11. As a result, the handoff control system and each base station must be on a large scale. A great amount of information must be transmitted between the control station 17 and the second base station 21 and the neighboring base stations 25.

Figure 3:
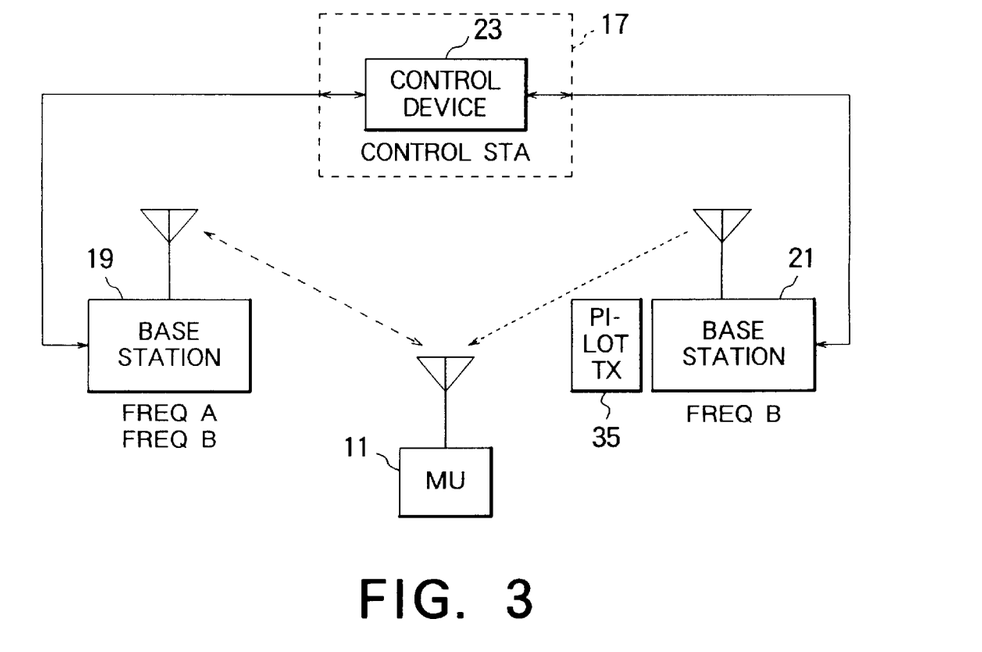
FIG. 3 is a schematic top view of a CDMA mobile communication network comprising a handoff control system according to a first embodiment of the instant invention.

Referring now to FIG. 3, the description will proceed to a handoff control system according to a first preferred embodiment of this invention. Throughout the following, similar parts are designated by like reference numerals and are similarly operable unless otherwise specifically mentioned. The handoff control system is used in the CDMA mobile communication network of the type described in the foregoing.

In FIG. 3, the cell border is not depicted because such a border has no important physical meaning in view of the fact that the uplink and the downlink handoff points may differ from each other as pointed out heretobefore. The reference numerals 13 and 15 for the first and the second cells are omitted merely for simplicity of illustration.

In the CDMA mobile communication network, it will be presumed that the first and the second base stations 19 and 21 are base stations of high and low traffic. The first and the second base stations 19 and 21 are therefore assigned with two layers and only a single layer of service frequencies. For example, the second service frequency B is additionally assigned to the first base station 19 while the second service frequency B alone is assigned to the second base station 21 in the manner indicated beside the first and the second base stations 19 and 21. In the first base station 19, the second service frequency B is used in traffic communication with another mobile unit (not shown) which may be concurrently present in the first cell 13 in addition to the mobile unit 11 kept in the traffic communication on the first service frequency A. In a specific case where necessity arises, it is possible to use the second service frequency B in an alternative use in the traffic communication between the first base station 19 and the mobile unit 11 currently present in the first cell 15.

The second base station 21 comprises a pilot transmitting device (PILOT TX) 35 which is depicted separately of the second base station 21 merely for clarity of illustration. As depicted by a dotted line with an arrowhead near the mobile unit 11, the pilot transmitting device 35 is for transmitting on the first service frequency A a pilot signal which can carry a limited amount of information as pointed out in the United States patent referred to hereinabove.

Figure 4:
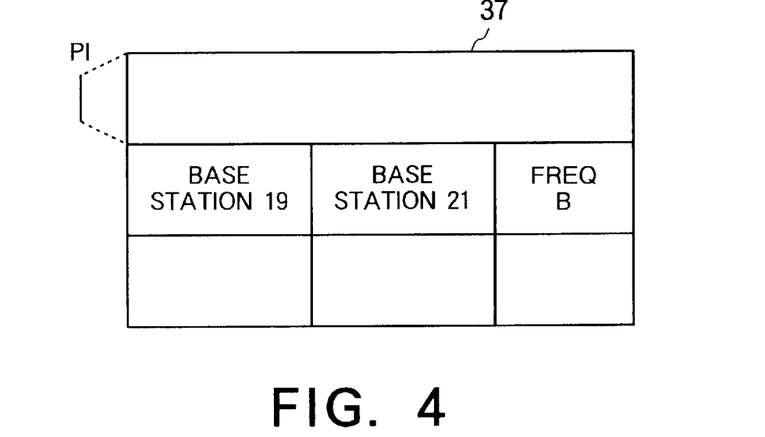
FIG. 4 exemplifies a table kept in a memory of the handoff control system illustrated in FIG. 3.

Turning to FIG. 4 with FIG. 3 continuously referred to, the control device 23 of the control station 17 comprises a memory 37 for keeping a table exemplified in FIG. 4. The table is accessible by pilot information (PI) specific to each pilot signal which may be the pilot signal being described. In order to access the table, the first base station 19 transmits to the control station 17, as adjacent information of the report of the field intensity measurement, the pilot information specific to the pilot signal transmitted from the pilot transmitting device 35 of the second base station 21. When accessed by the pilot information and when this pilot information is received from the first base station 19, the table identifies the second service frequency B which is assigned to the second base station 21 and is indicated on a rightmost column in the table. It is possible in connection with the above that the adjacent information is accompanied by the signal of the first service frequency A. It is furthermore possible to make the table indicate the second base station 21 in addition to the second service frequency B as indicated along a middle column. It should be noted in this connection that indication of the base station 21 in the table is not indispensable.

The illustrated handoff control system therefore comprises receiving means (RX) and dealing means (DL) which are depicted in FIG. 3 by each signal line and arrowheads directed towards and away from the control device 23. The receiving means receives from the first base station 19, together with the pilot information, an indication indicating, when the mobile unit 11 moves in the first cell 13 to approach the second cell 15 during the traffic communication on the first service frequency A, that the field intensity of the electromagnetic wave of the first service frequency A becomes objectionable below a predetermined limit either at the mobile unit 11 or at the first base station 19. In this event, the receiving means detects necessity of handoff of the first service frequency to a certain one of other service frequency. By referring to the memory 37 in response to the pilot information, the dealing means identifies the second service frequency B as the above-described one of other service frequencies and deals with the handoff from the first service frequency A to the second service frequency B for the traffic communication between the mobile unit 11 and the second base station 21.

Figure 5:
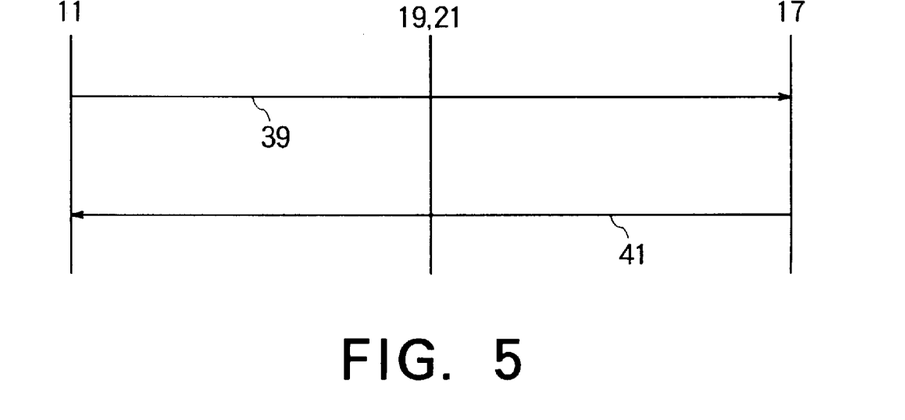
FIG. 5 is a sequence diagram for use in describing handoff control carried out by the handoff control system depicted in FIG. 3.

Referring to FIG. 5 and continuously to FIGS. 3 and 4, operation will be described in connection with the handoff control system being described. As in FIG. 2, the mobile unit 11 and the control station 17 are indicated together with the first and the second base stations 19 and 21 by three vertical lines with a middle vertical line used to indicate the first and/or the second base stations 19 and/or 21 depending on the circumstances. It will be surmised that the mobile unit 11 is in the first cell 13.

The first base station 19 transmits the pilot information on the first service frequency A to the mobile unit 11 as adjacent information accompanying the downlink traffic signal. The uplink traffic signal is transmitted from the mobile unit 11 to the first base station 19 also on the first service frequency A.

In this event, the mobile unit 11 continuously monitors in response to the pilot information the pilot signal and the field intensity of the electromagnetic wave received there on the first service frequency A. When the field intensity becomes objectionable below the predetermined limit, the mobile unit 11 sends an indication or report of this deteriorated field intensity as the uplink signal to the first base station 19, which conveys the indication to the control station 17 together with the pilot information. Transmission and conveyance of these indications are indicated by an upper horizontal line 39. Responsive to the indication conveyed, the receiving means finds the necessity of handoff.

It will now be additionally surmised that the mobile unit 11 moves towards the second cell 15 during the traffic communication on the first service frequency A although the handoff control system can not yet know the second cell 15 as the destination cell merely by the indication conveyed to the control station 17. When the necessity is detected and furthermore when the pilot signal is received at the mobile unit 11 with a predetermined intensity or above, the dealing means refers to the memory 37 and indicates hard handoff from the first service frequency A to the second service frequency B. This indication is conveyed from the control station 17 to the second base station 21 and is transmitted therefrom further to the mobile unit 11 as indicated by a lower horizontal line 41. The indication is furthermore conveyed from the control station 17 also to the first base station 19 to interrupt the indication of the pilot information which has been used as the adjacent information. The hard handoff is carried out in this manner in a short time interval when the necessity is detected.

It is possible to likewise measure the field intensity at regular intervals rather than continuously and at the first base station 19. Continuous measurement, however, dispenses with use of a memory and of refreshing means described in the United States patent being referred to. Transmission of the pilot information to the mobile unit 11 may be either only instantaneously upon entrance of the mobile unit 11 into the first cell 13 or intermittently during presence of the mobile unit 11 in the first cell 13 in connection with pilot signals which are used in the second base station 21 and in other neighboring base stations 25. Conveyance of the pilot information to the control station 17 may be only instantaneously together with the indication of the deteriorated field intensity. It is thus possible to render the handoff control system to a small scale and to reduce the amount of information transmitted between the first base station 19 and the control station 17 and between the first base station 19 and the mobile unit 11. It is furthermore possible to use a small amount of information in identifying similar pilot signals used in the neighboring base stations 25. Incidentally, it is possible to understand that the receiving means (RX) and the dealing means (DL) are alternatively represented by the horizontal lines 39 and 41.

Figure 6:
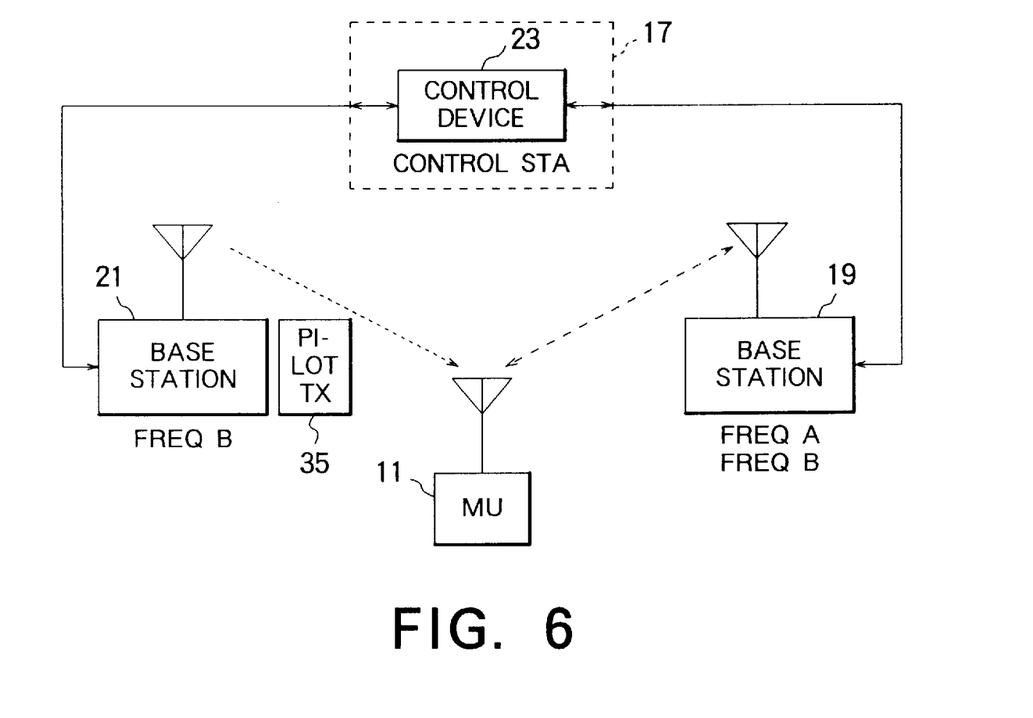
FIG. 6 is a schematic top view of a combination of a CDMA mobile communication network and a neighboring mobile communication network, which combination has a common service area for a mobile unit and comprises a handoff control system according to a second embodiment of this invention.

Referring to FIG. 6, attention will be directed to a handoff control system according to a second preferred embodiment of this invention. This handoff control system is for use in a combination of a CDMA mobile communication network and a neighboring or contiguous mobile communication network, which is not operable in accordance with the CDMA technique and is typically an analog cellular mobile communication network.

Each of the CDMA and the neighboring mobile communication networks has a service area. Merely for convenience of the description which follows, the service area of the neighboring mobile communication network is herein called a primary service area with that of the CDMA mobile communication network called a secondary service area. The primary and the secondary service areas may or may not partly overlap on each other and do define a common service area in which the mobile unit 11 is movable. The control station 17 is preferably in the common area and comprises the control device 23 which in turn comprises the memory 37 for the table and is accompanied by the receiving means (RX) or 39 and the dealing means (DL) or 41.

The primary service area is divided into a plurality of primary cells which may be the umbrella cells. The secondary service area is divided into another plurality of secondary cells, such as the microcells, some of which neighbor at least a pertinent one of the primary cells to form pairs of cells. In the common service area, such a pair of cells consists of a first cell 13 of the primary service area and a second cell 15 neighboring the first cell 13 in the secondary service area. The second cell 15 may be wholly included in the first cell 13, in which case only a part of the first cell 13 will herein be referred to afresh as a first cell 13 that has no common area with the second cell 15.

The first and the second base stations 19 and 21 are in the first and the second cells 13 and 15 with the first and the second service frequencies A and B and the second service frequency B alone assigned to the first and the second base stations 19 and 21, respectively. The pilot signal transmitting device 35 accompanies the second base station 21. In practice, the control station 17 is not connected directly to the base station 21 as depicted but is connected to another control station (not shown) of the secondary network through a network interface (not shown) with a result that status of the secondary network, such as the necessity of handoff, is transmitted to the control station 23 through the control station of the secondary network and the network interface. When the primary and the secondary service areas do not overlap but merely neighbor each other along an area border, it is possible to understand that the first and the second cells 13 and 15 are in the secondary and the primary service areas, respectively. In other respects, the handoff control system of FIG. 6 is similar in structure and operation to that illustrated with reference to FIGS. 3 to 5.

While this invention has thus far been described with specific reference to FIGS. 3 to 6, it will now be readily possible for one skilled in the art to put this invention into practice in various other manners. For example, it is possible that a satellite communication network is included either in the CDMA mobile communication network or in the combination described in the foregoing.

What is claimed is:

1. A handoff control method for use in a code division multiple access mobile communication network comprising a control station and first and second base stations connected to said control station and having a service area in which a mobile unit is movable and which is divided into a plurality of cells including first and second cells neighboring each other, said handoff control method comprising the steps of assigning first and second service frequencies to said first and said second base stations for traffic communication with said mobile unit, while said mobile unit is in said first and said second cells, detecting necessity of handoff between said first and said second service frequencies, and dealing with said handoff when said necessity is detected, wherein:

said assigning step assigns said second service frequency additionally to said first base station for an alternative use in said traffic communication and said first service frequency to said second base station for transmitting only a pilot signal;

said dealing step dealing with, while said mobile unit moves in said first cell towards said second cell during the traffic communication with said first base station on said first service frequency, handoff from said first service frequency to said second service frequency when said necessity is detected.

2. A handoff control method as claimed in claim 1, wherein said dealing step comprises the steps of:

keeping in said control station a table accessible by pilot information specific to said pilot signal for identifying said second service frequency;

receiving as detection of said necessity from said first base station an indication indicating, together with said pilot information, that a field intensity of an electromagnetic wave of said first service frequency becomes objectionable at said mobile unit; and referring responsive to said indication to said table to deal with the handoff from said first service frequency to said second service frequency.

3. A handoff control method as claimed in claim 2, wherein said first base station transmits said pilot information to said mobile unit to make said mobile unit continuously monitor the pilot signal received form said second base station on said first service frequency.

4. A handoff control method for use in a combination of a code division multiple access mobile communication network and a neighboring mobile communication network, said combination comprising a control station and first and second base stations connected to said control station and having a common service area in which a mobile unit is movable and which is divided into a plurality of cells including a first cell of said neighboring mobile communication network and a second cell neighboring said first cell in said code division multiple access mobile communication network, said handoff control method comprising the steps of assigning first and second service frequencies to said first and said second base stations for traffic communication with said mobile unit, while said mobile unit is in said first and said second cells, detecting necessity of handoff between said first and said second service frequencies, and dealing with said handoff when said necessity is detected, wherein:

said assigning step assigns said second service frequency additionally to said first base station for an alternative use in said traffic communication and said first service frequency to said second base station for transmitting only a pilot signal;

said dealing step dealing with, while said mobile unit moves in said first cell towards said second cell during the traffic communication with said first base station on said first service frequency, handoff from said first service frequency to said second service frequency when said necessity is detected.

5. A handoff control method as claimed in claim 4, wherein said dealing step comprises the step of:

keeping in said control station a table accessible by pilot information specific to said pilot signal for identifying said second service frequency;

receiving as detection of said necessity from said first base station an indication indicating, together with said pilot information, that a field intensity of an electromagnetic wave of said first service frequency becomes objectionable at said mobile unit; and referring responsive to said indication to said table to deal with the handoff from said first service frequency to said second service frequency.

6. A handoff control method as claimed in claim 5, wherein said first base station transmits said pilot information to said mobile unit to make said mobile unit continuously monitor the pilot signal received from said second base station on said first service frequency.

7. A handoff control method as claimed in claim 4, wherein said neighboring mobile communication network is an analog mobile communication network.

8. A handoff control system for use in a code division multiple access mobile communication network comprising a control station and first and second base stations connected to said control station and having a service area in which a mobile unit is movable and which is divided into a plurality of cells including first and second cells neighboring each other with said first and said second base stations assigned with first and second service frequencies for traffic communication with said mobile unit while said mobile unit is in said first and said second cells, said control station comprising a control device for detecting necessity of handoff between said first and said second service frequencies and for dealing with said handoff when said necessity is detected, wherein:

said first base station is additionally assigned with said second service frequency for an alternative use in said traffic communication;

said second base station comprising a pilot transmitting device for transmitting only a pilot signal on said first service frequency;

said control device dealing with, when said necessity is detected while said mobile unit moves in said first cell towards said second cell during the traffic communication with said first base station on said first service frequency, handoff from said first service frequency to said second service frequency.

9. A handoff control system as claimed in claim 8, wherein said control device comprises:

a memory for keeping a table accessible by pilot information specific to said pilot signal for identifying said second service frequency;

receiving means for receiving as detection of said necessity from said first base station an indication indicating, together with said pilot information, that a field intensity of an electromagnetic wave of said first service frequency becomes objectionable at said mobile unit; and dealing means by referring responsive to said indication to said memory for dealing with the handoff from said first service frequency to said second service frequency.

10. A handoff control system as claimed in claim 9, wherein:

said first base station transmits said pilot information to said mobile unit to make said mobile unit continuously monitor the pilot signal received from said pilot transmitting device and transmit said indication to said first base station;

said dealing means dealing with the handoff from said first service frequency to said second service frequency by referring to said table by using said pilot information and the fact that said pilot information is conveyed from said first base station.

11. A handoff control system for use in a combination of a code division multiple access mobile communication network and a neighboring mobile communication network, said combination comprising a control station and first and second base stations connected to said control station and having a common service area in which a mobile unit is movable and which is divided into a plurality of cells including a first cell of said neighboring mobile communication network and a second cell neighboring said first cell in said code division multiple access mobile communication network with said first and second base stations assigned with first and second service frequencies for traffic communication with said mobile unit while said mobile unit is in said first and said second cells, said control station comprising a control device for detecting necessity of handoff between said first and said second service frequencies and for dealing with said handoff when said necessity is detected, wherein:

said first base station is additionally assigned with said second service frequency for an alternative use in said traffic communication;

said second base station comprising a pilot transmitting device for transmitting only a pilot signal on said first service frequency;

said control device dealing with, when said necessity is detected while said mobile unit moves in said first cell towards said second cell during the traffic communication with said first base station on said first service frequency, handoff from said first service frequency to said second service frequency.

12. A handoff control system as claimed in claim 11, wherein said control device comprises:

a memory for keeping a table accessible by pilot information specific to said pilot signal for identifying said second service frequency;

receiving means for receiving as detection of said necessity from said first base station an indication indicating, together with said pilot information, that a field intensity of an electromagnetic wave of said first service frequency becomes objectionable at said mobile unit; and dealing means by referring responsive to said indication to said memory for dealing with the handoff from said first service frequency to said second service frequency.

13. A handoff control system as claimed in claim 12, wherein:

said first base station transmits said pilot information to said mobile unit to make said mobile unit continuously monitor the pilot signal received from said pilot transmitting device and transmit said indication to said first base station;

said dealing means dealing with the handoff from said first service frequency to said second service frequency by referring to said table by using said pilot information and the fact that said pilot information is conveyed from said first base station.

14. A handoff control system as claimed in claim 11, wherein said neighboring mobile communication network is an analog mobile communication network.

15. A control station for use in a code division multiple access mobile communication network comprising first and second base stations connected to said control station and having a service area in which a mobile unit is movable and which is divided into a plurality of cells including first and second cells neighboring each other with said first and said second base stations assigned with first and second service frequencies for traffic communication with said mobile unit while said mobile unit is in said first and said second cells, said control station comprising a control device for detecting necessity of handoff between said first and said second service frequencies and for dealing with said handoff when said necessity is detected, wherein:

said first base station is additionally assigned with said second service frequency for an alternative use in said traffic communication;

said control device dealing with, when said necessity is detected while said mobile unit moves in said first cell towards said second cell during the traffic communication with said first base station on said first service frequency, handoff from said first service frequency to said second service frequency.

16. A handoff control station as claimed in claim 15, wherein said control device comprises:

a memory for keeping a table accessible by pilot information specific to said pilot signal for identifying said second service frequency;

receiving means for receiving as detection of said necessity from said first base station an indication indicating, together with said pilot information, that a field intensity of an electromagnetic wave of said first service frequency becomes objectionable at said mobile unit; and dealing means by referring to responsive said indication to said memory for dealing with the handoff from said first service frequency to said second service frequency.

17. A control station as claimed in claim 16, wherein said dealing means deals with the handoff from said first service frequency to said second service frequency by referring to said table in response, in addition to said indication, to the fact that said indication is received from said first base station.

18. A control station for use in a combination of a code division multiple access mobile communication network and a neighboring mobile communication network, said combination comprising first and second base stations connected to said control station and having a common service area in which a mobile unit is movable and which is divided into a plurality of cells including a first cell of said neighboring mobile communication network and a second cell neighboring said first cell in said code division multiple access mobile communication network with said first and said second base stations assigned with first and second service frequencies for traffic communication with said mobile unit while said mobile unit is in said first and said second cells, said control station comprising a control device for detecting necessity of handoff between said first and said second service frequencies and for dealing with said handoff when said necessity is detected, wherein:

said first base station is additionally assigned with said second service frequency for an alternative use in said traffic communication;

said second base station comprising a pilot transmitting device for transmitting only a pilot signal on said first service frequency;

said control device dealing with, when said necessity is detected while said mobile unit moves in said first cell towards said second cell during the traffic communication with said first base station on said first service frequency, handoff from said first service frequency to said second service frequency.

19. A control station as claimed in claim 18, wherein said control device comprises:

a memory for keeping a table accessible by pilot information specific to said pilot signal for identifying said second service frequency;

receiving means for receiving as detection of said necessity from said first base station an indication indicating, together with said pilot information, that a field intensity of an electromagnetic wave of said first service frequency becomes objectionable at said mobile unit; and dealing means by referring responsive to said indication to said memory for dealing with the handoff from said first service frequency to said second service frequency.

20. A control station as claimed in claim 19, wherein said dealing means deals with the handoff from said first service frequency to said second service frequency by referring to said table in response, in addition to said indication, to the fact that said pilot information is received from said first base station.

* * * * *